Figure 1:
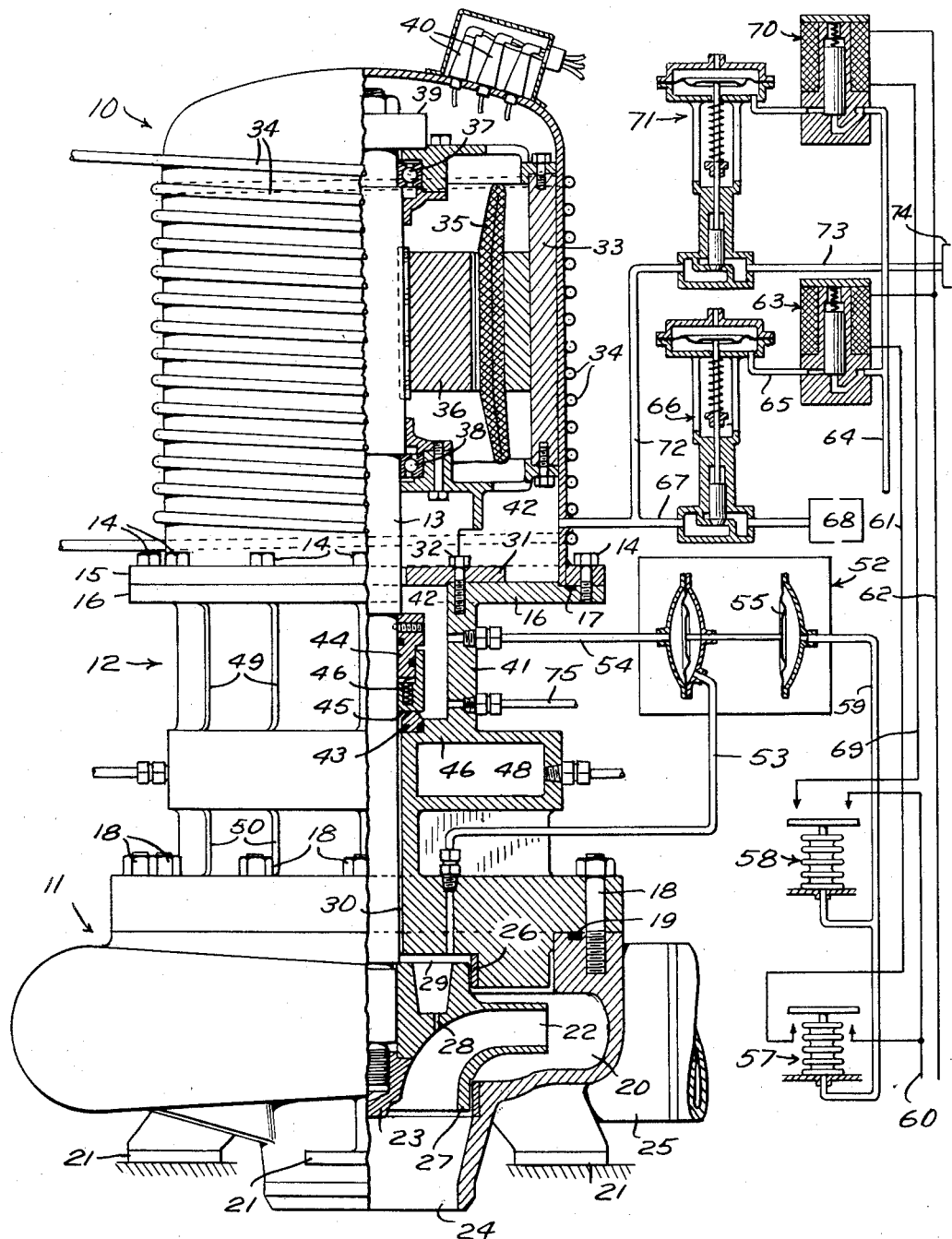

Nov. 10, 1959   B. S. TUCKER   2,911,919
PUMPING SYSTEM

Filed July 23, 1957   2 Sheets-Sheet 1

INVENTOR
BELDEN S. TUCKER
BY
George F. DesMarais
ATTORNEY

United States Patent Office 2,911,919
Patented Nov. 10, 1959

2,911,919
PUMPING SYSTEM

Belden S. Tucker, Swarthmore, Pa., assignor to C. H. Wheeler Manufacturing Company, Philadelphia, Pa., a corporation of Pennsylvania Application July 23, 1957, Serial No. 673,632

7 Claims. (Cl. 103—87)

The invention relates to pumping systems for pumping liquids under high pressure, and particularly to systems employing enclosed motor-pump combinations.

The system of the present invention includes a motor-pump combination wherein a pump is driven by the shaft of the motor and the motor is entirely isolated from the pump and the pumping liquid in a pressurized atmosphere of an inert gas. The motor and the gas are contained in a container which together with a pump housing and a hollow member connecting between the container and the housing constitute a casing capable of withstanding very high fluid pressures.

Access of the pumping liquid to the gas-filled motor chamber is prevented by sealing means and by devices which are piloted by the pressure of the pumping liquid and are responsive to the pumping pressure and to the pressure of the gas in the motor chamber for establishing a moderately low differential pressure across the sealing means. In this manner the motor is not affected or interfered with by the pumping liquid, the pumping liquid is not contaminated by a lubricant most serviceable for the motor, and any chance leakage across the seal is controlled.

It is also among the attainments of the invention to provide a pumping system of the type described wherein the motor is operable at high efficiency notwithstanding its containment within a pressure vessel, and the temperatures of pumping liquids to which the confining casing of the motor and the pump may be subjected.

The apparatus is so constructed and arranged to mount a vertical shaft motor within a chamber filled with an inert gas, such as helium. A saving of electrical energy is attained by enabling the use of a motor having a minimum electro-magnetic gap, as compared with the loss of power attending the use of an envelope or envelopes separating the stator of a motor from its rotor.

Oil or other liquid surrounding a rotor impedes its rotation with additional resultant loss of efficiency, and other problems incident to vapor or wet conditions require special attention which results in expensive costs. These disadvantages are obviated in the present invention by exposing both the stator and the rotor to only a relatively dry atmosphere of an inert gas under pressure.

Figure 2:
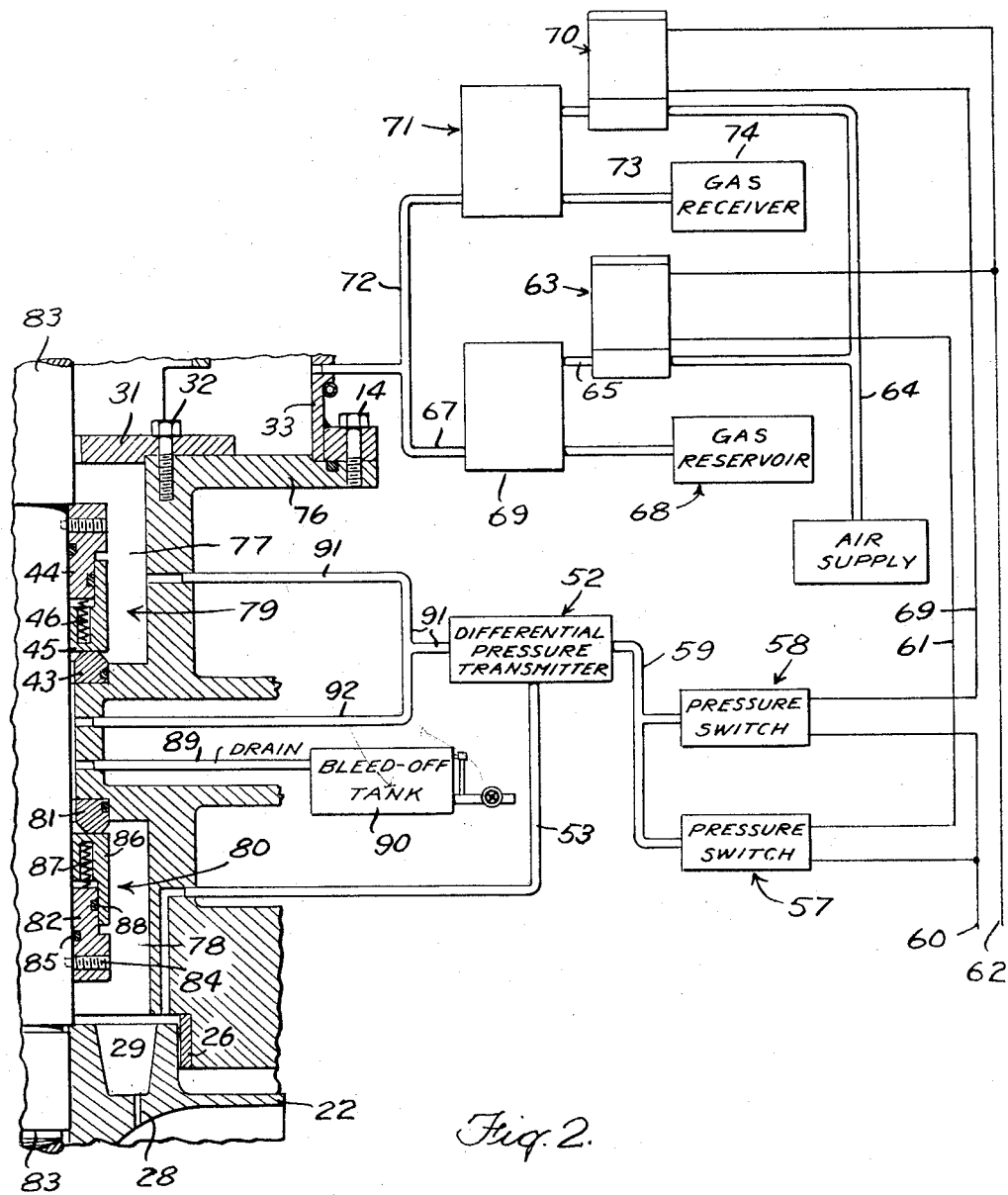

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawing forming a part hereof, and in which:

Fig. 1 is an elevational view of a motor-pump combination, shown partly in section, and of pressure-controlling devices, and Fig. 2 illustrates a modification of the pumping system.

The principle of the invention and various details are illustrated in the drawing for the purpose of explanation, but it is to be understood that the details may be modified and that other instrumentalities may be substituted for those specifically described within the spirit of the appended claims and without departure from the broad aspect of the invention.

The system of the present invention includes a pressure-proof casing including a container 10, a pump housing 11 and a member 12 connecting between the container and the pump. The member 12 provides a enclosure for the passage of a motor shaft 13 between the container and the pump housing. The complete casing is constructed in a manner and of such materials as to enclose a sealed-in pumping unit capable of function for pumping fluids such as water, oils and industrial liquids under any pressure desired.

The container 10 is tightly secured to the member 12 by a plurality of bolts 14 engaging the flanges 15 and 16 of the motor container and member 12, respectively. A gasket 17 effects a gas-tight seal between the flanges. The member 12 is likewise bolted to the pump housing 11 by a plurality of studs and nuts 18. The superposed portions of the member 12 and of the pump housing 11 forcibly contain a gasket 19 which seals the pump chamber 20 from the outside atmosphere.

The motor-pump assembly is vertically disposed and may be mounted on and supported by the suction and discharge connections to the pump, or in any other manner, as by a set of legs 21. The pump is of the centrifugal type having an impeller 22 which is fast to the motor shaft 13 and is held against a shoulder on the shaft by a retaining nut 23. Liquid is taken into the pump through a suction inlet 24 and delivered from a discharge nozzle 25.

Wearing rings 26 and 27 are mounted in the pump housing outside of the hub ends of the impeller. A passage 28 extends from the interior of the impeller to the space 29 above the upper outside surface of the impeller. The impeller is hydraulically balanced radially and axially to reduce bearing loads. The shaft 13 is clear of the wall of a bore 30 or central opening in the hollow connecting member 12 and the bore is in open communication with the space 29.

The motor operates in a gaseous atmosphere. The base 31 of the motor is bolted to the flange 16 by a plurality of bolts 32. The cylindrical exterior of the motor housing 33 is preferably finished to provide a metal-to-metal contact with the interior of the container 10 for effecting rapid conduction of heat to the exterior of the container. If desired, the exterior of the motor housing may be ribbed, or provided with fins extending to the wall of the container, or otherwise provided with suitable heat transfer means to conduct the motor heat to the container. A suitable coolant is circulated through a heat exchanger in the form of a coil 34 around the container. The motor stator 35 is supported by the motor housing, and the rotor 36 is secured to the shaft 13.

The motor shaft is rotatably supported in a bearing 37 and in a radial and thrust bearing 38, and its upper end may carry a non-reversible ratchet device 39 of conventional design to fix the direction of rotation. The bearings are preferably sealed and may be of a pre-lubricated type or fashioned for the forcible application of a suitable lubricant. Since the motor and the motor shaft bearings are completely isolated from the pumping liquid any suitable motor of a standard vertical shaft type may be used.

The motor shaft is supported by the bearings in cantilever fashion and extends freely through the motor base and the member 12 and into the pump chamber. Connections to the motor are made through insulated connectors 40 which are sealed in the wall of the container 10 and enclosed in a terminal box.

The member 12 intermediate the container 10 and the pump housing 11 has a circular wall 41 which surrounds an annular space in which sealing means are located. The sealing means establish a barrier around the motor shaft and divide the interior of the casing (10, 11, 12) into two pressure zones, one including the motor chamber 42 and one including the pump chamber 29. Any suitable sealing means capable of maintaining a sealing relationship above the differential pressure which is desired to be maintained in a particular system may be used.

As shown in Fig. 1, a suitable sealing means comprises a stationary ring 43 which is mounted in the member 12 in sealing relationship therewith, a ring 44 fast to the shaft 13 and sealed with respect thereto, an intermediate ring 45 in a sealed telescoping relationship with the ring 44 and resiliently pressed against the stationary ring 43 by a plurality of springs 46, circumferentially spaced-apart and carried by the intermediate ring, as is well understood. The rotary seal is accomplished between a hardened transverse surface on the intermediate ring which slips over a corresponding abutting surface on the stationary ring as the motor shaft rotates. The sealing qualities of the seal should preferably be such as to effectively seal under full differential pressure of the system to atmospheric pressure at least for a short term operation in the event of a pressure failure of the system.

The member 12 of the casing also contains a chamber 48 through which a coolant may be circulated as required when heat dissipation must be accomplished. A set of radial fins 49 and a set 50, located respectively at either side of the chamber 48, assist to dissipate heat from the liquid around the shaft and from the connecting member 12.

The motor operates in a gaseous atmosphere under a pressure slightly less than the pressure of the pumping liquid, and the motor-pump system of the present invention enables the pressure of the gas to be controlled by a pressure balancing device which is piloted from the pump discharge. The pumping liquid pressure is accessible to the bore 30 around the lower part of the shaft 13 from the space or chamber 29 within the impeller housing. The motor chamber 42, including the free space about the stator and the rotor, is filled with a pressurized inert gas, such as helium, which has access to the outer side of the rotary seal through openings in the motor base 31. During operation of the system a desired pressure differential across the rotary seal is maintained substantially constant within a narrow low pressure range by a group of instruments which control the introduction of gas and the withdrawal of gas from the motor chamber. These instruments include a differential pressure transmitter capable of converting the differential pressure across the rotary seal to a responsive movement or signal which controls switches and valves to cause the pressure in the motor chamber to be increased or decreased as required to maintain a desired pressure differential across the rotary seal regardless of change in the pumping liquid pressure.

A variety of types of mechanical, hydraulic and electrical devices are available for accomplishing the control desired, and it will suffice for the understanding of the principles involved and the operation of the invention to describe suitable instrumentalities with reference to a representative system. A selected group of conventional instruments is diagrammatically illustrated in the drawing. The high pressure side of a differential pressure transmitter 52 is tapped into the pump housing 11 through a conduit 53, and the low pressure side is connected with the motor chamber 42 through a conduit 54 which is tapped into the wall 41 of the connecting member 12.

Any change in the differential pressure acting on the flexible diaphragm or bellows 55 effects a pneumatic signal proportionally to the differential pressure existing at any moment and transmits the signal to pressure-responsive switches 57 and 58 through a conduit 59. The transmitter and the switches are adjustable to maintain any desired pressure differential within a range of 0 to 15 p.s.i., or at any differential within the sealing capacity of the rotary seal employed.

Assuming that a pressure differential of about 9.5 p.s.i. is desired, the pressure responsive switch 57 is set to close an electrical circuit 60—61—62 on a transmitter output equivalent to slightly below 9.5 p.s.i. differential across the rotary seal. When this transmitter output equivalent is reached, the closing of the circuit opens solenoid valve 63 which is normally closed across a low pressure air supply line 64. The opening of the solenoid valve 63 causes air to be supplied through a conduit 65 to a normally closed open-shut diaphragm motor valve 66. The air supply is maintained at a moderately low constant pressure (normally less than 18 p.s.i.) and sufficient for actuating the particular diaphragm motor valves employed.

The admission of air to the motor valve 66 opens the valve and permits entry of an inert gas to the chamber 42 through a conduit 67. The gas is received from a gas supply reservoir 68 in which the supply of gas is maintained under a pressure exceeding the upper limit of any pressure which might be desired to be maintained within the chamber 42. As soon as the differential pressure across the seal goes up to slightly above the 9.5 p.s.i. setting of the switch 57, the electrical circuit 60—61—62 is broken and the supply of gas is discontinued by the automatic closing of the motor-valve 66.

If during the period of supplying gas to the motor chamber 42, the differential pressure across the seal should become greater than 10.5 p.s.i. (due to transient times involved or to any other reason), the second pressure responsive switch 58 will close a second electrical circuit 60—69—62 to open a normally closed solenoid valve 70 in the air supply conduit 64. The opening of the solenoid valve 70 permits air to flow from the supply conduit 64 to a second normally closed open-shut diaphragm motor valve 71. The opening of the valve 71 permits gas to flow from the motor chamber 42 through a conduit 72 and a conduit 73 to a low pressure gas receiver 74 and from which it can be recovered.

It is to be understood that the instruments are adjustable to attain any desired differential across the seal and hence pressure difference beween the pumping liquid and the gas in the container 10. Once the desired differential is attained and so long as the pumping head is constant there would result only sporadic operation of the instruments and valves due to leakage from the container, or possibly due to some slight leakage of liquid through the rotary seal. A normally closed drain pipe 75 is provided to enable the exhaustion of any liquid which might settle in the lower end of the space around the rotary seal.

A modified form of sealing means is illustrated in Fig. 2. In this arrangement the hollow interior of the connecting member 76 is fashioned to provide two seal-containing chambers 77, 78. Chamber 77 accommodates a rotary seal 79 adapted to run dry. The rotary seal 80 in the chamber 78 includes a stationary ring 81 which is mounted in the connecting member 76 in sealing relationship therewith. A ring 82 is fastened to the motor shaft 83 by set screws 84 and is sealed with respect to the shaft by an O-ring 85. An intermediate ring 86, fitting closely with the shaft ring 82, is pressed into engagement with the stationary ring 81 by a plurality of springs 87. An O-ring 88 seals between the intermediate ring and the shaft ring.

In this arrangement the drain pipe 89 is tapped into the annular space between the two seals 79 and 80 in order to provide a drain for any leakage which might occur through the seal 80. Pumping liquid drained through the pipe 89 is conducted to a bleed-off tank 90 from which it may be removed by manual or automatic control. The gas pressure conduit 91 connecting with the low pressure side of the differential pressure transmitter 52 is provided with a branch 92 tapped into the annular space between the two seals 79 and 80, whereby the pressure on opposite sides of the seal 79 is the same as that prevailing in the motor chamber. Except for the changes incident to the provision of multiple seals the pumping system operates in the manner described with reference to the showing in Fig. 1.

In describing the invention reference has been made to certain pressure conditions in the interest of convenience, but it is to be understood that the motor-pump combination is primarily for the purpose of pumping liquids at high pressures, that greater or lesser differential pressures may be made to prevail to best suit a particular operation, that the motor-pump combination may be cooled or heated to control operating temperatures at the pump and seal-containing chambers depending on whether the system is to be used for pumping hot or cold liquids, and that while the system is designed to use instruments and elements in the combinations and relationship described, some of these may be altered or replaced by equivalent devices and others omitted without departure from the invention and the general results outlined.

What is claimed is:

1. In a motor-pump system, the combination comprising a pressure-proof casing enclosing a motor chamber, a pump chamber and a passageway therebetween, opposite end portions of said passageway communicating with said motor chamber and said pump chamber, respectively, a motor in said motor chamber and having a shaft extending through said passageway to said pump chamber, said pump chamber having suction and delivery openings, a pump impeller in said pump chamber, said pump impeller connected to said shaft, a rotary seal about said shaft for effecting a fluid seal along said shaft and said passageway and dividing the interior of said casing into a pressure zone including said motor chamber to one side of said rotary seal and a pressure zone including said pump chamber to the other side of said rotary seal, means for supplying an inert gaseous fluid under pressure to said motor chamber, and means for adjusting the pressure of the gaseous fluid in said motor chamber relatively to the pressure in said pump chamber.

2. In a motor-pump system, the combination comprising a pressure-proof casing enclosing a motor chamber, a pump chamber and a passageway therebetween, opposite end portions of said passageway communicating with said motor chamber and said pump chamber, respectively, a motor mounted in said motor chamber and having a shaft extending through said passageway to said pump chamber, a pump impeller driven by said shaft, means in said passageway separating said motor chamber and said pump chamber into separate pressure zones, said means including a rotary seal about said shaft for effecting a fluid seal along said shaft and said passageway, means for supplying gas to and for withdrawing gas from said motor chamber to vary the pressure of gas in said motor chamber, and control means for controlling said gas-supplying and exhausting means and the supply and exhaustion of gas to and from said motor chamber, said control means responsive to the differential pressure of the pressures at either side of said rotary seal whereby gas is supplied or exhausted from said motor chamber to maintain the gas in said motor chamber at a desired pressure relatively to the pressure in said pump chamber.

3. In a motor-pump system, the combination comprising a pressure-proof casing enclosing a motor chamber, a pump chamber and a passageway therebetween, opposite end portions of said passageway communicating with said motor chamber and said pump chamber, respectively, a motor in said motor chamber and having a shaft extending through said passageway to said pump chamber, said pump chamber having suction and delivery openings for receiving and discharging liquid, a pump impeller in said pump chamber, said pump impeller connected to said shaft, means in said passageway separating said motor chamber and said pump chamber into two separate pressure zones, said means including a rotary seal about said shaft for effecting a fluid seal along said shaft and said passageway, means for supplying gas and for withdrawing gas from said motor chamber, a differential pressure transmitter connected to either side of said separating means, and means operable by said transmitter for controlling said gas-supplying and exhausting means to maintain the gas in said motor chamber at a desired pressure relatively to the pressure in said pump chamber.

4. In a motor-pump system, the combination comprising a pressure-proof casing having a motor chamber and a pump chamber, a motor mounted in said motor chamber, said motor having a shaft passing from said motor chamber into said pump chamber, said pump chamber having suction and discharge openings for receiving and discharging liquid, a pump impeller in said pump chamber, said impeller connected to said shaft, a wall intermediate said motor chamber and said pump chamber, said wall having an opening for the passage of said shaft, a rotary seal, said rotary seal having a part in sealing relationship with said wall and a rotary part in sealing relationship with said shaft whereby leakage of liquid from said pump chamber to said motor chamber is repressed, control means for controlling the pressure of gas in said motor chamber, operating means for said control means, said operating means communicating with said motor chamber and with said pump chamber and responsive to differential pressure between said two chambers whereby said control means is operated to maintain the pressure of gas in said motor chamber at a desired pressure relatively to the pressure of the liquid in said pump chamber.

5. In a motor-pump system, the combination comprising a pressure-proof casing having a motor chamber and a pump chamber, a motor mounted in said motor chamber, said motor having a shaft passing from said motor chamber into said pump chamber, said pump chamber having inlet and outlet openings, a pump impeller in said pump chamber, said impeller connected to said shaft, means separating said motor chamber from said pump chamber, said separating means comprising a wall and a rotary seal about said shaft and having a non-rotating part in sealing relationship with said wall and a rotary part in sealing relationship with said shaft whereby leakage along said shaft from said pump chamber to said motor chamber is repressed, means for draining liquid from the low pressure side of said rotary seal, control means for controlling the pressure of gas in said motor chamber, operating means for said control means, said operating means communicating with said motor chamber and with said pump chamber and responsive to a differential pressure between said two chambers whereby said motor is maintained in a gaseous atmosphere under a gaseous pressure less than the pressure of the liquid in said pump chamber.

6. In a motor-pump system, the combination comprising a pressure-proof casing enclosing a motor chamber, a pump chamber and a passageway, said passageway disposed intermediate said motor chamber and said pump chamber and having opposite end portions communicating, respectively, with said motor chamber and said pump chamber, a motor in said motor chamber and having a shaft extending through said passageway to said pump chamber, a pump impeller connected to said shaft, and fluid sealing means about said shaft for dividing said casing to provide a pressure zone including said motor chamber to one side of said sealing means and a pressure zone including said pump chamber to the other side of said sealing means.

7. In a motor-pump system, the combination comprising a pressure-proof casing enclosing a motor chamber, a pump chamber and a passageway therebetween, a motor in said motor chamber and having a shaft extending through said passageway to said pump chamber, a pump impeller connected to said shaft, sealing means intermediate said motor chamber and said pump chamber, said sealing means comprising a plurality of rotary seals disposed in series along said shaft and providing an enclosed space within said passageway between successive seals, a differential pressure transmitter, conduits connecting one side of said transmitter to said motor chamber and said enclosed space, a conduit connecting the other side of said transmitter to said pump chamber, means operable by said transmitter for controlling the pressure of gas within said motor chamber and said enclosed space, and means for draining said enclosed space.

References Cited in the file of this patent
UNITED STATES PATENTS
2,075,895     Harmon _____ Apr. 6, 1937